United States Patent [19]
Frederickson

[11] 3,881,250
[45] May 6, 1975

[54] CHAIN SAW FILTER ASSEMBLY

[75] Inventor: Robert Eugene Frederickson, Southgate, Calif.

[73] Assignee: McCulloch Corporation, Los Angeles, Calif.

[22] Filed: Nov. 8, 1972

[21] Appl. No.: 304,592

[52] U.S. Cl. ............... 30/383; 55/491; 55/493; 55/518; 55/DIG. 31; 123/119 R
[51] Int. Cl. ............................................ B23d 49/00
[58] Field of Search ............ 30/381, 383; 210/495; 123/198 E, 122 R, 119 A, 119 R; 55/491, 490, 493, 495, 497, 500, 501, 502, 503, 509, 511, 515, 516, 518, 519, 481, DIG. 28, DIG. 31

[56] References Cited
UNITED STATES PATENTS

| | | | |
|---|---|---|---|
| 1,215,974 | 2/1917 | Orem | 55/501 X |
| 2,459,194 | 1/1949 | Sparklin | 55/495 X |
| 2,789,663 | 4/1957 | Camp | 55/DIG. 31 |
| 3,048,960 | 8/1962 | Ohlson | 55/372 |
| 3,057,115 | 10/1962 | Bilanin | 137/550 X |
| 3,142,550 | 7/1964 | Kuehne | 55/495 |
| 3,224,174 | 12/1965 | Erbstoesser | 55/DIG. 28 |
| 3,477,209 | 11/1969 | Fesco | 55/367 |
| 3,498,280 | 3/1970 | Zimmer et al. | 123/122 R |
| 3,509,696 | 5/1970 | Thompson | 55/518 X |
| 3,525,373 | 8/1970 | Kobayashi | 30/381 |
| 3,542,095 | 11/1970 | Frederickson | 30/381 |
| 3,678,973 | 7/1972 | Loop | 123/119 A X |
| 3,712,033 | 1/1973 | Gronholz | 55/500 X |

FOREIGN PATENTS OR APPLICATIONS

| | | | |
|---|---|---|---|
| 963,004 | 7/1964 | United Kingdom | 55/490 |
| 996,820 | 6/1965 | United Kingdom | 210/484 |
| 178,501 | 3/1962 | Sweden | 55/490 |
| 257,284 | 6/1954 | U.S.S.R. | 55/493 |

*Primary Examiner*—Bernard Nozick
*Attorney, Agent, or Firm*—Burns, Doane, Swecker & Mathis

[57] ABSTRACT

A chain saw filter assembly comprising a pair of apertured plates sandwiching therebetween a piece of relatively thin, inexpensive filter material. The plates are formed of plastic and are hinged together. Each plate is provided with peripheral sealing ridges for imposing an air seal around the filter assembly when the assembly is urged against a seating ledge by a removable cover member.

6 Claims, 7 Drawing Figures

PATENTED MAY 6 1975    3,881,250

CHAIN SAW FILTER ASSEMBLY

BACKGROUND OF THE INVENTION

This invention relates to apparatus for filtering intake air of internal combustion engines. More particularly the invention relates to an air filter assembly for a chain saw engine.

Portable chain saws utilizing internal combustion engines are widely employed. A typical chain saw includes a housing, an engine within the housing, a guide bar extending from the housing, and an endless cutting chain mounted upon the periphery of the guide bar. The cutting chain is operately connected with and driven by the engine mounted within the housing. With the engine being thus disposed in the immediate vicinity of the cutting chain, utilization of the saw results in the imposition around the engine of an atmosphere which consists of a high concentration of fine wood and other dust particles. As a consequence, it is a common practice to employ a filtering medium in the carburetor air intake passage to segregate dust particles from air being fed to the carburetor and internal combustion engine.

It has been heretofore known to utilize a sheet of felt material which is layed across the air inlet passage and fastened in a suitable manner, as described for example in Zimmerer et al. U.S. Pat. No. 3,498,280 issued July 15, 1968 to the assignee of the subject application. Filters of this type are generally fabricated of sufficient thickness to enable them to maintain their shape and posture while being subjected to a swift flow of carburetor intake air therethrough. It is a conventional practice among most chain saw operators to clean the filter after it has absorbed particles to the point where it is no longer effective. Typical cleaning operations can range from a thorough washing of the filter in a solution of fuel, to simply striking the filter against a log. These operations, besides being inconvenient, can become expensive in terms of wasted man-hours. Moreover, it has been found that many chain saw operators, in order to conserve costs, may continue to use a filter beyond its effectiveness without cleaning it. Such a practice can result in the air intake flow being severely retarded and thereby adversely affecting the performance and life of the engine.

Further, felt filters as conventionally utilized in chain saws employing two cycle engines, often subject carburetor inlet air to the influence of the engine power piston. As a result, the carburetor inlet air is acted upon by the reciprocating power piston and is caused to pulsate. Pulsating air passing through the filter tends to cause the filter to flex inwardly and outwardly at high rates. If this flexing becomes severe enough, the filter may tear. In order to prevent tearing the filter must be fabricated of a thickness sufficient to withstand the pulsating air currents. The additional thickness of a filter required to withstand these pulsations adds extra cost to the filter, and constitutes an added restriction to the free flow of air through the filter.

A still further problem involved with the use of conventional felt filters is that incoming air may tend to lift the edges of the filter in areas where the filter is not pressed downwardly, enabling the air to flow around and beneath the filter. As a result, unfiltered air enters the carburetor. One known solution to this problem involves supplementing the filter with a molded-on rubber sealing edge which may be directly engaged and depressed by a cover member. The addition of such a sealing strip, while effectively resisting the tendency of the inlet air to seep around the filter edges, increases the cost of the filter.

OBJECTS OF THE INVENTION

It is therefore a general object of the invention to provide a novel apparatus which will obviate or minimize problems of the type previously described.

It is a particular object of the invention to provide a novel and inexpensive apparatus for effectively removing particulate matter entrained in the intake air of a chain saw internal combustion engine.

It is another object of the invention to provide a novel air filter assembly for the air intake of a chain saw internal combustion engine which may utilize an economically disposable filter material.

It is still another object of the invention to provide a novel filter assembly for a chain saw internal combustion engine which may facilitate the use of a filter fabricated of significantly reduced thickness.

It is a further object of the invention to provide a novel air filter assembly for a chain saw internal combustion engine which will impose an effective air shield around the periphery of the filter.

It is yet a further object of the invention to provide a novel air filter assembly for a chain saw internal combustion engine which will utilize a filter braced and supported in a manner enabling the filter to withstand effects imposed thereon by pulsating inlet air.

It is still a further object of the invention to provide a novel air filter assembly for a chain saw internal combustion engine which may be readily utilized with conventional chain saw designs.

BRIEF SUMMARY OF THE INVENTION

An apparatus intended to accomplish at least some of the foregoing objects comprises a chain saw which includes a housing, an internal combustion engine carried by the housing and having a carburetor, an air inlet passage formed in the housing, and a filter assembly disposed in the air inlet passage for removing particulate matter from inlet air being conducted to the carburetor.

The filter assembly includes a piece of filter material supported by a filter holder. The filter material comprises a wafer-thin strip of low-cost fabric. The holder comprises a pair of apertured plates which are arranged to encompass the filter in a juxtaposed arrangement which effects a firm, yet air permeable, support for opposite sides of the filter.

The holder preferably is formed from a molded piece of flexible plastic which may be folded over along a centrally-located hinge axis. The holder is symetrically configured about the hinge axis to define a pair of identical flexible plates which are disposed in face-to-face relationship with the holder in a folded posture. Each plate is of grid-like construction, defining a plurality of air passages. When the holder has been folded to sandwich a piece of filter material between the plates, the air passages of the plates are in alignment and are adapted to conduct inlet air through the filter. Grid-forming ribs of the plates serve to brace each side of the filter enabling the filter to withstand the effects of pulsating inlet air flow.

The holder plates are each provided with flexible sealing beads extending around peripheral rim portions of the plates. The sealing beads are operable to impart an effective air seal around the filter when the rim portions of the plates are pressed against a seating ledge of the chain saw housing.

A removable cover element for the housing is provided and has a surface for pressing the plates against the seating ledge.

Retainer holes are formed in the hinged filter plates and in the filter material. In an assembled condition of the filter assembly, a threaded pin mounted on the chain saw housing passes through the retainer holes to bring the plates into alignment. The pin is operable to receive a conventional tightening means to clamp the cover element against the filter assembly. Additional sealing beads are carried by the plates in encircling relationship around the pin to effect an air seal therearound.

DRAWINGS

In describing the invention, reference will be made to a preferred embodiment shown in the appended drawings.

DETAILED DESCRIPTION OF A PREFERRED EMBODIMENT OF THE INVENTION

Figure 1:
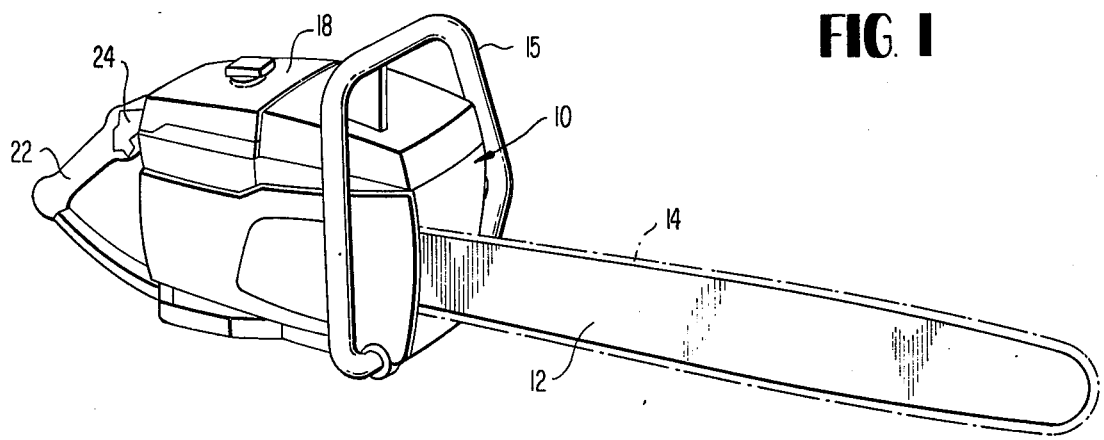
FIG. 1 is a perspective view of a chain saw utilizing the filter assembly according to the invention.
Figure 2:
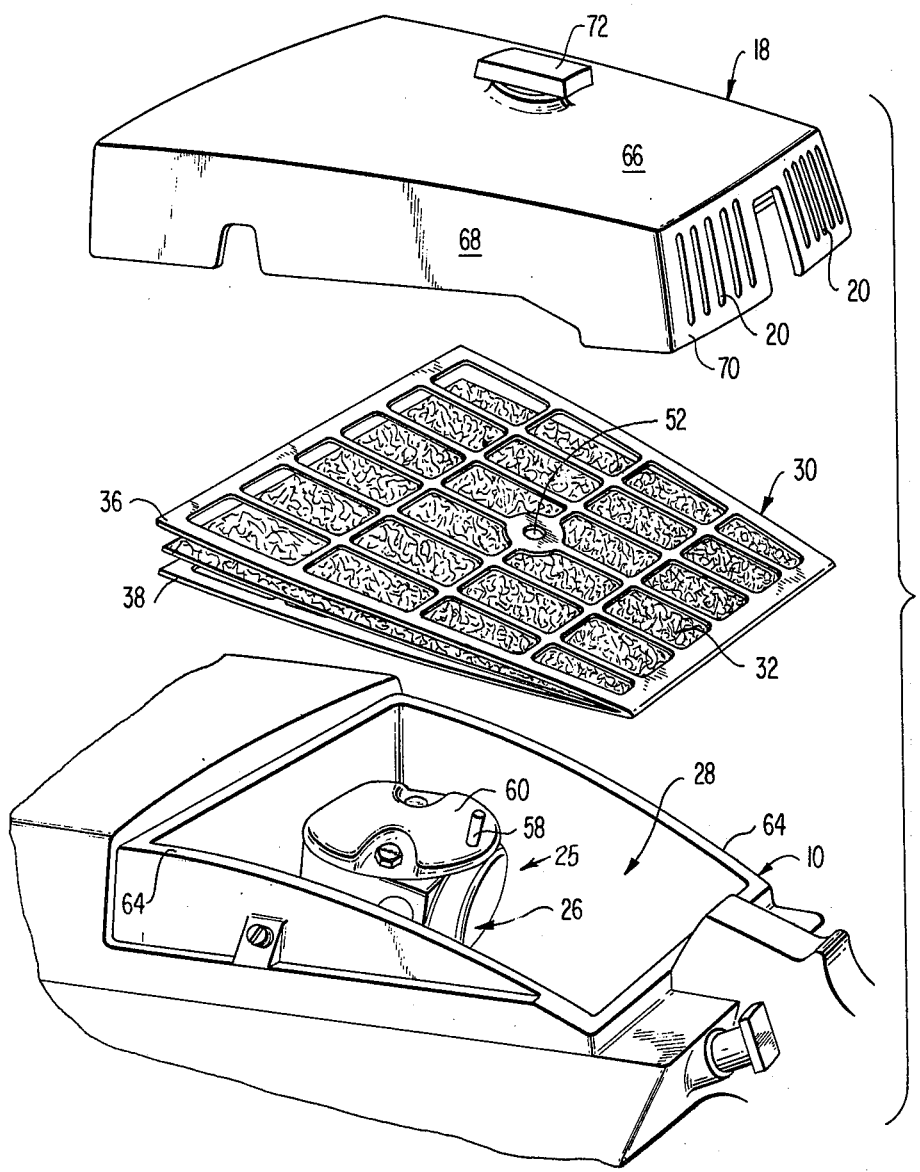
FIG. 2 is an exploded view in perspective of an embodiment of the filter assembly comprising the subject invention.

FIGS. 1 and 2 depict a conventional chain saw. The saw includes a housing 10 and a guide bar 12 connected to the housing. An endless cutting chain 14 is entrained around the guide bar. The saw may be manually manipulated by utilizing a frame handle 15 and a control handle 22. Speed of the cutting chain is controlled by actuation of a throttle trigger 24. An engine breathing air flow system is provided through the housing 10 and includes inlet openings 20 in a cover member 18.

An engine 25 is carried within the housing 10 and includes a piston, cylinder, and crankshaft (not shown) conventionally arranged to drive the saw chain. The engine also includes a carburetor 26 for supplying an air-fuel mixture to the cylinder.

The air inlets 20 admit air into an air inlet chamber 28 which is arranged to conduct air to the intake of the carburetor. Removably disposed across the air intake chamber is a filter assembly 30 arranged to segregate particulate matter, such as dust particles from the incoming air.

Figure 5:
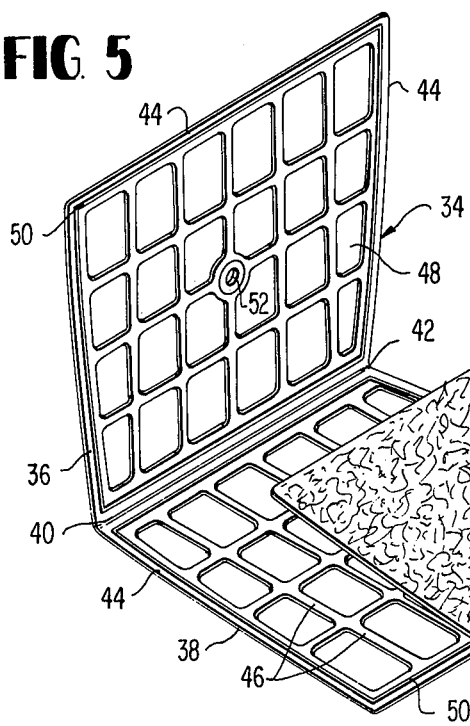
FIG. 5 is an expanded perspective view of the filter assembly per se.

The filter assembly, note FIG. 5, includes a layer of filter material 32 and a filter holder 34.

The filter material 32 comprises a wafer-thin piece of fabric which is preferably formed of fibers which are non-woven, however woven fibers may be utilized. These fibers may be arranged in either a parallel or random orientation, although the latter is preferred. For example, filter material of the non-woven, parallel fiber type which have been found to produce advantageous results may be purchased from the Chicopee Manufacturing Company, Non-Woven Fabrics Division, under the code numbers S–950–3053 and S–1250–3058. The fabric is treated so as to be resistant to water and solvents such as fuel and oil. Filters of this type are inexpensive to manufacture, and a savings on the order of over 90% as compared to conventional felt filters may be realized. As a consequence, these filters may be economically thrown away or disposed of on a regular, possibly daily, basis.

In addition, these filters are thinner than conventional filters and may be stacked into compact, lightweight packets which may be conveniently carried by an operator at a job site.

Figure 3:
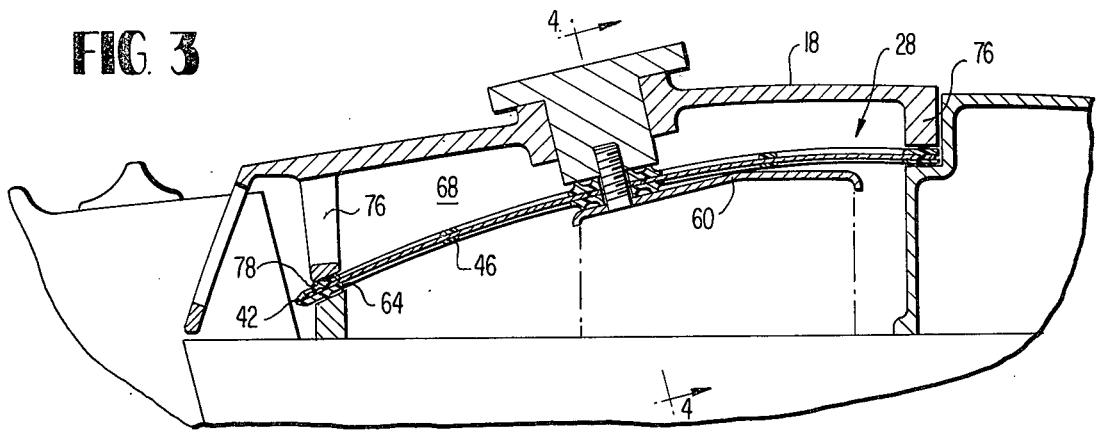
FIG. 3 is a cross sectional view of a portion of the chain saw illustrating the filter assembly in an assembled posture.
Figure 4:
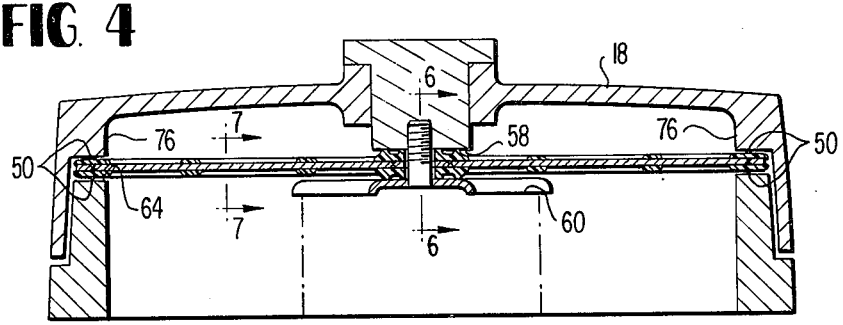
FIG. 4 is a view taken along section line 4—4 in FIG. 3.

The holder 34 comprises a pair of apertured plates 36 and 38 which are disposable on opposite sides of the filter to define therewith a sandwich-like filter assembly (note FIGS. 2–4).

According to a preferred form of the invention, the holder comprises a molded piece of flexible, resilient material which has a scored portion 40 of reduced thickness defining a hinge axis 42 about which the holder may be folded. The holder is symmetrically configured about the hinge axis to define the pair of flexible plates 36 and 38.

Each flexible plate comprises a grid-shaped structure including a continuous flat outer rim 44 and a network of criss-crossing ribs 46. The rim 44 and the ribs 46 combine to define a plurality of apertures 48 for the conductance of intake air. Disposed around the rim 44 of each apertured plate and projecting outwardly therefrom, is a continuous sealing bead or ridge 50. The beads 50 project from both sides of each plate and function to provide an effective air seal around the periphery of the filter assembly as will be subsequently more fully discussed.

Central holes 52 and 54 are formed in the flexible plates and the filter respectively, which are alignable in the folded position of the holder to define a passage 56 for the reception of a retainer pin 58. The pin 58 is mounted on a retainer bracket 60 which is suitably fastened to the carburetor.

Circular sealing beads 62 project from the holder plates and extend around the periphery of the pin passage for establishing an air seal as will be later described.

Figure 6:
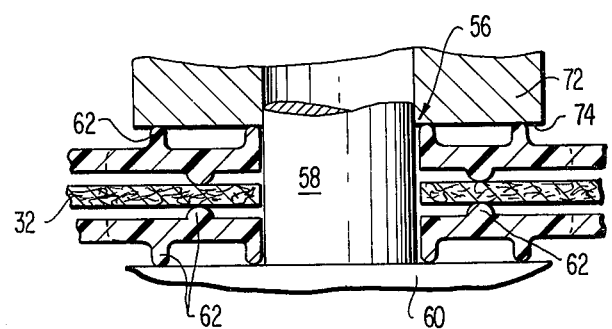
FIG. 6 is an enlarged cross sectional view taken along section line 6—6 in FIG. 4 and discloses in detail a sealing arrangement about an aperature in the filter assembly.

The housing of the chain saw is provided with a flat ledge or seat 64 which is shaped generally complementary to the holder and is somewhat curved from front to back to conform to the overall shape of the chain saw housing, note FIG. 2. The filter assembly 30 may be laid onto the ledge with the pin 58 projecting through the passage 56, as is shown in FIGS. 3, 4, and 6. In this fashion, the pin 58 serves to maintain the flexible plates 36 and 38 in face-to-face alignment.

To maintain the filter assembly in a proper posture during operation of the saw, the metallic cover 18 is provided. The cover includes a top wall 66, a plurality of side walls 68 and a rear wall 70. The top wall is apertured to receive a nut 72 which is threadably insertable onto a threaded end of the pin 58. The nut includes a bottom face 74 which is engagable with the uppermost parts of the circular sealing beads 62. Within the confines of the side and rear walls of the cover 18 are disposed a plurality of shoulder sections 76 which define a generally continuous pressure surface 78 facing the ledge seat 64 and the rim of the filter holder. Thus, with the cover disposed atop the filter assembly, and with the nut 72 tightened onto the pin 58, the pressure surface 78 will press downwardly against the uppermost of the sealing beads 50, thereby urging the lowermost of the sealing beads 50 against the seating ledge 64 and the innermost of the sealing beads 50 against opposed surfaces of the filter, note FIG. 7. In this fashion, an effective seal is imposed around the periphery of the filter assembly to prevent incoming air from entering beneath the edges of the filter and thus by-passing the filtering operation.

In like manner, the circular sealing beads 62 will be compressed between the bracket 60 and the face 74 of the nut to create an air seal around the periphery of the passage 56.

Many conventional chain saws are provided with a seating ledge and a retainer pin and are suitable for carrying the novel filter assembly provided by this invention without requiring modification of the saw housing.

INSTALLATION AND OPERATION -

To install the filter assembly within a chain saw, the holder is swung open about the hinge axis 42 and a filter 32 is inserted between the flexible plates 36 and 38. This assemblage of the holder and the filter sandwiched therebetween is laid onto the seating ledge 64 of the housing, with the pin 58 projecting through the aligned holes 52 and 54. With the pin being disposed through these holes it is assured that the plates 36 and 38 and the filter 32 will be maintained in proper alignment.

Figure 7:
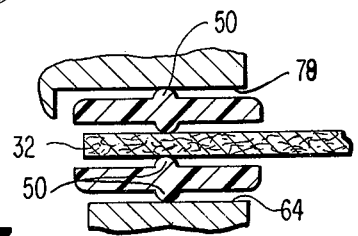
FIG. 7 is an enlarged cross sectional view taken along section line 7—7 in FIG. 4 and discloses in detail a sealing arrangement about the periphery of the filter assembly.

The cover 18 is next placed onto the housing and the nut 72 is tightened to urge the pressure surface 78 against the sealing beads 50 to impose an effective air seal around the periphery of the filter (note FIG. 7).

Similarly, the face 74 of the nut 72 will press downwardly upon the sealing beads 62 to create an air seal around the passage 56.

With the chain saw in operation, substantially all intake air will be directed through the filter 32, due to the effective seal provided by the flexible sealing beads, and harmful particles will be prevented from reaching vital engine parts.

Moreover, pulsations of the filter which may be created by the chain saw engines will be effectively resisted by the holder, due to the bracing effect on the filter imposed by the ribs 46 of the apertured plates 36 and 38. At the same time, however, the apertures 48 of the plates permit an ample flow of air to be conducted to the carburetor.

When the filter becomes embedded with particulate matter to the point where it is no longer effective, or even on a routine daily basis, it may be disposed-of economically in view of its low cost.

MAJOR ADVANTAGES AND SCOPE OF THE INVENTION

The filter assembly according to the present invention utilizes a relatively inexpensive filter which may be economically discarded. This eliminates the time required for filter-cleaning operations and lessens the tendency for chain saw operators to employ a filter beyond its effective life.

By utilizing a pair of grid-ilke plates disposed on opposite sides of the filter, the holder will brace the filter against the effects of a pulsating air flow.

The flexible sealing beads disposed around the edges of the holder strengthen the holder and are operable to impose an effective air seal around the periphery of the filter assembly, thus eliminating the need for molding a special material onto the edges of the filter.

The filter assembly according to the invention is capable of being utilized on many conventional chain saws without requiring modification of the saw housing.

The filter assembly in accordance with the invention has been described in conjunction with its beneficial use in a chain saw engine. It will be appreciated, however, that such a filter assembly may have utility in internal combustion engines employed with devices other than chain saws.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A chain saw comprising:
   a metallic housing;
   a guide bar connected to said housing;
   a cutting chain carried by said guide bar;
   an internal combustion engine carried by said housing and including a carburetor;
   air passage means communicating with said carburetor;
   a stationary retainer plate attached to said housing and located in said air passage means;
   a vented metallic cover removably disposed over said air passage means;
   said cover and said retainer plate including fastener means for releasably attaching said cover to said housing, said fastener means including a connector pin;
   a filter assembly for segregating particulate matter from inlet air passing through said inlet air passage means, said filter assembly comprising:
   at least one sheet of filter material, said filter sheet including an aperture accommodating passage of said connector pin, and
   a one-piece holder formed of a flexible material for supporting said flexible sheet of filter material, said holder comprising a pair of apertured plates integrally joined along a common side to define a hinge axis for said plates, each plate comprising:
   a peripheral rim,
   a network of criss-crossing ribs defining a plurality of apertures including an aperture receiving said connector pin, first resilient sealing ridge means projecting from both sides of said rim and extending substantially continuously around said rim, and second resilient sealing ridge means projecting from both sides of the portion of said rib network defining said pin-receiving aperture to surround the latter;

said holder being foldable along said hinge axis to orient said plates in superposed relationship with said sheet of filter material sandwiched between said plates and engaged by internally located ones of said first and second sealing ridge means, with the apertures of said plates being in general alignment; and seating ledge means on said housing for receiving said filter assembly;

said cover including pressure surface means engageable with externally located ones of said first and second sealing ridge means of one plate for urging internally located ones of said first and second sealing ridge means against opposite sides of said filter sheet, and urging externally located ones of said first and second sealing ridge means of the other plate against said seating ledge means, so as to impose an air seal around the periphery of said filter assembly and around said pin-receiving aperture when said cover is secured to said housing by said fastener means.

2. A chain saw according to claim 1 wherein said hinge axis is defined by a strip of reduced thickness along the common joining side of said plates.

3. A chain saw according to claim 2 wherein said fastener means of said cover and said retainer plate includes a nut for threadingly receiving said connector pin; said nut carrying a portion of said pressure surface means, which last-named portion engages externally located ones of said second sealing ridge means; and said connector pin being affixed to said retainer plate.

4. A chain saw according to claim 3 wherein each plate includes a pair of externally located second sealing ridge means that are offset in the plane of the holder with respect to a single internally located second sealing ridge means.

5. A chain saw according to claim 3 wherein said filter sheet comprises a non-woven fabric.

6. An engine assembly comprising:
a metallic housing;
an internal combustion engine carried by said housing and including a carburetor;
air passage means communicating with said carburetor;
a stationary retainer plate attached to said housing and located in said air passage means;

a vented metallic cover removably disposed over said air passage means;

said cover and said retainer plate including fastener means for releasably attaching said cover to said housing, said fastener means including a connector pin;

a filter assembly for segregating particulate matter from inlet air passing through said inlet air passage means, said filter assembly comprising:

at least one sheet of filter material, said filter sheet including an aperture accommodating passage of said connector pin, and a one-piece holder formed of a flexible material for supporting said flexible sheet of filter material, said holder comprising a pair of apertured plates integrally joined along a common side to define a hinge axis for said plates, each plate comprising:

a peripheral rim, a network of criss-crossing ribs defining a plurality of apertures including an aperture receiving said connector pin, first resilient sealing ridge means projecting from both sides of said rim and extending substantially continuously around said rim, and second resilient sealing ridge means projecting from both sides of the portion of said rib network defining said pin-receiving aperture to surround the latter;

said holder being foldable along said hinge axis to orient said plates in superposed relationship with said sheet of filter material sandwiched between said plates and engaged by internally located ones of said first and second sealing ridge means, with the apertures of said plates being in general alignment; and seating ledge means on said housing for receiving said filter assembly;

said cover including pressure surface means engageable with externally located ones of said first and second sealing ridge means of one plate for urging internally located ones of said first and second sealing ridge means against opposite sides of said filter sheet, and urging externally located ones of said first and second sealing ridge means of the other plate against said seating ledge means, so as to impose an air seal around the periphery of said filter assembly and around said pin-receiving aperture when said cover is secured to said housing by said fastener means.

* * * * *